United States Patent Office 3,536,697
Patented Oct. 27, 1970

3,536,697
PROCESS FOR IMPROVING THE PROCESSABILITY OF REFINED CELLULOSE PULP
Frans Kolosh and Fred E. Gartner, Molndal, Sweden, assignors to Mo och Domsjo Aktiebolag, Ornskoldsvik, Sweden, a limited company of Sweden
No Drawing. Filed Oct. 3, 1969, Ser. No. 863,689
Claims priority, application Sweden, Oct. 3, 1968, 13,372/68
Int. Cl. C08b 1/00, 1/04, 1/08
U.S. Cl. 260—217
6 Claims

ABSTRACT OF THE DISCLOSURE

A process is provided for improving the processability of refined cellulose pulp having a relatively low content of resins, sometimes referred to as "dissolving pulp," which may be reacted under acid or under alkaline acid conditions, more particularly in the preparation of cellulose xanthate (viscose) and cellulose acetate. Said process comprises adding an ethylene oxide adduct and an alkylpolyglycolether to cellulose pulp and processing the pulp in the presence of said additives.

---

The present invention relates to a process for improving the processability of refined cellulose pulps and in particular refined cellulose pulps having a relatively low resin content which are suitable for use as dissolving pulps. One of the important uses for such pulps is in the viscose process which is carried out in an alkaline medium. Other processes using such pulps, mainly nitration and acetylation, are performed in an acid medium.

It has long been recognized that it is desirable to produce a cellulose pulp having a relatively low content of resins, especially when such a pulp is to be used as a dissolving pulp in a reaction under alkaline conditions such as the preparation of cellulose xanthate, and acidic esterification processes such as in the preparation of cellulose esters, especially cellulose acetate.

The presence of resins in the pulp has an influence upon the color of the final cellulosic product and increases its tendency to yellow when heated. Viscose products such as rayon wood intended for sanitary purposes, or for use in sausage skins made from a regenerated cellulose, as well as all other rayon products which are subjected to drying or curing processes at high temperatures tend to yellow if the resin content is too high. In addition, the resin content of the pulp has a pronounced influence on the fatigue strength of rayon cord such as used in the manufacture of tires. A high resin content, or a large variation in the resin content of the cellulose pulp from batch to batch, makes it considerably more difficult to use cellulose pulp in the production of rayon cord having satisfactorily uniform fatigue strengths. These difficulties are well recognized, and are discussed in Rydholm, Pulping Processes, pages 1176–1180 (Interscience Publishers, New York, 1965).

The presence of resins in the cellulose pulp also causes foaming during the aeration of esterified or etherified products, more particularly in the aeration of viscose during the ripening process prior to spinning. This foaming is due in part to the fact that the resins contain surface active components (mainly alkaline soaps) which lower the surface tension of the esterified or etherified cellulose product. In addition the resins have a stabilizing effect on the foam once it is formed. If there is a strong foam formation it is difficult to completely remove gas bubbles that are present in the cellulosic solution and in the case of viscose, this causes spinning difficulties due to broken or brittle filaments in the resulting rayon fibers, or to film breakage in the production of transparent cellulose film such as cellophane. In addition, the presence of resins in the pulp is known to give viscose solutions which are turbid, as is also the case with the cellulose esters such as the cellulose acetate, especially in the organic solvents used for spinning the acetate.

The resin components of cellulose pulp are described in detail in the literature, more particularly, at pages 1025 et seq. and 1176–1180, of Pulping Processes by Sven A. Rydholm, identified above. Some of these resins in the resulting final dissolving pulp have been chlorinated during the bleaching steps to which a refined cellulose pulp is invariably subjected, and such chlorinated resins are capable of evolving hydrochloric acid when heated which is a reason for the negative influence of the resin upon the thermal stability of rayon cord, especially when fatigue is a factor. In addition, these resin components either alone or in combination with inorganic impurities in the dissolved pulp to be used for making fibers may clog the fine channels of the spinnerette, resulting in spinning difficulties and a fiber of low quality. To achieve the above results, it is generally desirable to process the pulp in such a manner that the pulp has a relatively low resin content prior to the dissolution of the same. Viscose pulp normally contains 0.15 to 0.40% resins, according to Rydholm, page 1176.

However, complete removal of the resins from the wood pulp is difficult to attain, both from a practical point of view as well as from an economic one, and such removal also gives rise to certain undesirable processing properties. When the resin content of the pulp is too low (below 0.15% based on the dry pulp) difficulties may arise in conjunction with the handling of the pulp, which difficulties generally are described as a poorer processability. For example, a pulp of too low resin content (i.e. 0.02 to 0.1% of resin on a dry basis as measured by extraction with dichloromethane) results in a more difficult viscose filtration as compared with the viscose prepared from the corresponding pulps having a normal to high resin content of more than 0.15%. Viscose produced from the first-mentioned pulp with the low resin content contains a much greater number of gel particles which clog the pores of the filtering material as compared with the last mentioned pulp having the normal to high resin content. In addition, a pulp having too low a resin content gives a rayon product which has a greater tendency toward milkiness or low gloss than is the case with a corresponding product made from a pulp having a normal to high resin content.

It will be apparent that the presence of resins in the pulp has advantages as well as important disadvantages, and there appears to be no optimum resin content at which all the advantages are obtained and the disadvantages are eliminated.

It has been proposed in the prior art, in order to counteract the poorer processability of the low resin pulp, to add to the pulp a certain amount of a synthetic surface active compound which typically has a high surface activity and imparts a low surface tension to liquids containing the same. The addition of these compounds improves the processability of the pulp and prevents the formation of "milky" rayon products, i.e. rayon products with a low gloss. For this purpose a number of various types of conventional surface active compounds have been proposed, for example, non-ionic surfactants such as ethylene oxide derivatives of fatty alcohols and fatty amines, anion active surfactants such as sulphonated vegetable oils, cation active surfactants such as lauryl pyridinium sulphate and quaternary ammonium compounds. When these compounds are utilized in connection with an alkaline esterification to make viscose it is essential that they be added to the alkali or to the alkali-cellulose prior to the completion of the xanthation.

Notwithstanding the fact that such synthetic surface active compounds have the above described advantages, their use has always proved to be accompanied by a number of difficulties. The use of such surface-active compounds, particularly increases in the floating tendency of the pulp sheets and results in an uneven action of the alkali upon the cellulose with a consequent unsatisfactory filtration of the viscose. Due to the reduction in the surface tension of the viscose, which is caused by the addition of such surface active compounds, there are foaming problems during the aeration of the viscose and during the ripening stage. The dispersing effect of these surface active compounds can also cause difficulties in the spinning due to the fact that surface activity results in the loosening of deposits from the walls of the various vessels and conduits which results in the contamination of the viscose with resulting difficulty or impossibility of spinning it.

It has now been found, in accordance with the process of the invention, that certain organic compounds with no or low surface activity are very effective in improving the processability of refined cellulose, such as the so-called dissolving pulps, in either alkaline or acid esterification or etherifications. By the phrase "no or low surface activity" is meant that any of the compounds in a concentration of 0.2 gram per liter in distilled water has a surface tension of at least 55 dynes/cm. These organic compounds have the same beneficial influence upon the reactivity of the pulp during its dissolution and upon the filterability of the solution as do the conventional surface agents normally used as additives, but they do not show the disadvantages of the latter.

These compounds in addition to improving the processability and filtration of the dissolved pulp do not cause a formation of foam during the aeration part of the process and since they do not appreciably lower the tension of the dissolved pulp they may be added without the risk of dislodging old deposits from the equipment and thus interfering with the filterability or spinning of the solution. These chemical compounds also are soluble in the cellulosic solutions, and in the case of viscose do not make the same turbid during ripening. In the production of cellulose acetate, the reactivity of the pulp during the acetylation is improved. During the preparation of alkali cellulose, in which the alkali cellulose is then converted into hydroxyethyl cellulose, the fiber losses are materially reduced.

The organic compounds mentioned in the previous paragraph have the general formula: $RO(C_2H_4O)_nH$ wherein R designates the radical

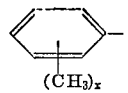

where $x$ is 0 to 2 and $n$ is a number from 5 to 30, and represents the average number of such units in the molecule. R may be phenyl, tolyl or xylyl. They are known compounds, made by condensing ethylene oxide with the corresponding phenolic compound. This type of compound will be referred to herein as Adduct A.

Notwithstanding the addition of such compounds, with the resulting advantages described above, it has been found that their use results in lower fatigue value in rayon cord, difficulties in dyeing rayon textile fibers and possibly a harmful biological action when the film is used as a wrapping material for foods. In order that such compounds may not be present in the final cellulose products, it is desirable that they be removed during further processing steps of the cellulosic solution in the form of films or other products. Because the above mentioned organic compounds have little or no surface activity, their removal in subsequent steps is not achieved to a great extent. It has been found, surprisingly, that the addition of certain methyl, ethyl and propyl ethylene oxide derivatives, in addition to the compounds above mentioned as Adduct A, greatly increases the solubility of the above mentioned Adduct A compounds in the various solutions to which the cellulosic compositions are subsequently subjected, such as spinning baths, washing waters, etc.

These methyl, ethyl and propyl ethylene oxide derivatives are obtained by the addition of ethylene oxide to methanol, ethanol or propanol with the formation of compounds having the general formula $R_1O(C_2H_4O)_mH$ wherein $R_1$ is $CH_3-$, $C_2H_5-$ or $C_3H_7-$ and $m$ is a number from 5 to 25, preferably 8 to 15, and represents the average number of such units in the molecule. This type of compound is well known and will be referred to hereinafter as Adduct B.

As in the case of the Adduct A compounds, these Adduct B compounds also must satisfy the requirement of no or low surface activity as defined heretofore, namely, that aqueous solutions of the compounds in a concentration of 0.2 gram per liter of distilled water results in a surface tension of at least 55 dynes/cm.

As it will appear from the above formulae, adduct compounds containing one or two ethylene oxide groups are excluded from the present invention since they do not yield the desired effect. Only compounds having at least five ethylene oxide groups will attain the desired result.

The relative proportions of Adduct A to Adduct B added to the cellulosic compositions may vary from a ratio of 50:50 to 95:5, preferably within the range of 80:20 to 90:10. The combination of the two adducts is referred to hereinafter as the adduct mixture.

The amount of the adduct mixture that is added to the pulp in order to achieve the desired processability lies within the range of 0.2 to 4.0 grams, preferably between 0.5 and 2.0 grams, per kilogram of dry cellulose.

The invention as described above therefore may be summarized and recapitulated by saying that it relates to a process for the production of cellulose derivatives from a cellulose pulp in which process, during the preparation of the derivatives from the pulp, there is added an ethylene oxide adduct having a surface tension of at least 55 dynes/cm. having the general formula $$RO(CH_2H_4O)_nH$$

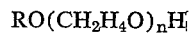

in which R is a phenyl, tolyl or xylyl radical, and $n$ is a number from 5 to 30, and represents the average number of such units in the molecule, in combination with an alkylpolyglycol ether having a surface tension of at least 55 dynes/cm. having the general formula $$R_1O(C_2H_4O)_mH$$

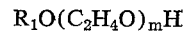

in which $R_1$ is a methyl, ethyl or propyl radical and in which $m$ is a number of 5 to 25, and represents the average number of such units in the molecule, and the weight of the ratio of the first mentioned adduct and the second mentioned adduct is from 50:50 to 95:5, preferably 0:20 and 90:10, and the amount of the two adducts added is 0.2 to 4.0 grams, preferably 0.5 to 2.0 grams, per kilogram of dry cellulose.

The adducts may be added to the cellulose or to a pulp containing the same either in admixture as the adduct mixture or separately as Adduct A and Adduct B, and if added separately may be added at different times, provided that both adducts are added at some stage before the completion of the dissolution of the cellulose, which in the case of viscose is prior to the completion of the xanthation, or in the case of acidic esterification, prior to the acylation.

The Adducts A and B or the adduct mixture may be added to the wet pulp on the wet-lap forming machine before the dry end thereof. If they are liquid they may be added by spraying them directly or, since they are generally soluble in water, they may be added as an aqueous solution. In addition, they may be applied by rotating rollers or by any other mechanical device. The particular method of adding the adducts is not critical nor is the timing, as long as it is achieved within the time limits set forth above. In addition, the adducts can be added to an ingredient such as to the lye used to convert the cellulose to alkali cellulose prior to the xanthation.

The following examples illustrate the invention.

EXAMPLE 1

A sulphite pulp sheet having a relatively low content of extractable resin (0.10% in a dichloromethane extract and 0.03% in an ethanol extract) was treated with 10% aqueous solutions of different adduct mixtures according to the invention so that the adduct mixture was evenly distributed over the whole pulp sheet in an amount corresponding to 1 gram and 3 grams, respectively, of adduct mixture per kg. of pulp on a dry basis. After the treatment the pulp sheets were dried at 20° C. and 50% of relative humidity. For comparison the same pulp was treated with the same volume of distilled water without any additive. The dried pulp sheets were mercerized in a 19% NaOH-solution of 20° C. for 60 minutes. After pressing out the excess of lye, shredding and ripening of the alkali cellulose (30.0% of cellulose and 15.9% of NaOH), carbon disulphide was added for xanthation. The added amount of carbon disulphide was 33.6% based upon the cellulose in the alkali cellulose. The xanthation was carried out at 25° C. for two hours. The xanthate formed was dissolved in dilute NaOH-solution so that a viscose containing 7.3% of cellulose and 5.4% of NaOH was obtained. Dissolution was effected at 15° C. during five hours. The filterability of the viscoses obtained was determined. The results are indicated in Table I, in which the $K_w$-values stated are filter clogging constants determined by means of the filtering time and the weight of the filtrate when the viscose was forced through a filter under standardized conditions. Since the conditions were the same in all cases, and the $K_w$ values are relative, details of the filtering procedure are thought to be unnecessary. The lower the $K_w$-value the easier the viscose is to filter, and as a result the lifetime of the filter is increased. Adduct A designates the phenol polyalkyleneglycol adduct, and Adduct B designates the solubilized alkyl polyethylene glycol adduct.

TABLE I

| Adduct mixture No. | Adduct A | Adduct B | Added amount g./kg. | $K_w$ |
|---|---|---|---|---|
| 1 | 90% of phenol plus 15 mols of ethylene oxide. | 10% of ethanol plus 14 mols of ethylene oxide. | 1<br>3 | 30<br>25 |
| 2 | 50% of phenol plus 5 moles ethylene oxide. | 50% of ethanol plus 20 moles of ethylene oxide. | 1<br>3 | 43<br>34 |
| Reference test (no additions). | | | | 98 |

From the results it appears that a very marked improvement in filterability was obtained with the adduct mixtures of the invention.

EXAMPLES 2 TO 4

Adduct mixture No. 1 of Example 1 was added to a sulphite pulp with relatively low resin content (0.10% in a dichloromethane extract and 0.03% in an ethanol extract) at three different stages of the drying and mercerizing processes in the viscose preparation. The added amount in each instance was 1 gram per kg. of dry cellulose. The adduct mixture was evenly distributed over the whole pulp sheet. The three different places of addition were:

Example 2—in the wet pulp before drying,
Example 3—in the dry pulp after the drying machine, or
Example 4—during the shredding of the alkali cellulose.

The viscose was prepared in the same way as described in Example 1. The filterability value ($K_w$) amounted to 112 with no additive, and to 32, 31 and 34 respectively for Examples 2 to 4. The results show that the advantageous effect of the invention is obtained irrespective of the process step during which the adduct mixture is incorporated before the completion of the xanthation.

EXAMPLES 5 AND 6

The surface tension of viscoses prepared in accordance with Example 1, but made with a pre-hydrolyzed sulphate pulp with a low content of extractable resin (0.05% in a dichloromethane extraction) and a cellulose content of 5% was determined by means of a De Noüy type ring tensiometer at a temperature of 20° C. The procedure in all tests was identical. The amount of the adduct mixture was 0.1 gram per kg. of viscose corresponding to 2 grams per kg. of dry cellulose. The results obtained are found in Table II.

TABLE II

| Example No. | Adduct mixture | Surface tension, dynes/cm. |
|---|---|---|
| 5 | 1 | 56.8 |
| 6 | 2 | 57.8 |
| Reference test (no additions) | | 61.0 |

The tests show that the adducts of the invention have a very small influence upon the surface tension of the viscose.

The surface tension of a viscose prepared as described above but from a pulp with a high resin content (0.54% in a dichloromethane extraction) and with no other additives amounted to 38.2 dynes/cm. The influence of the resin upon the surface tension of the viscose is very significant due to the fact that the resin soaps and other similar substances have surface-active properties.

EXAMPLE 7

A commercial high grade pulp of low acetylation reactivity was treated in sheet form with a 10% solution of adduct mixture No. 1. The amount was 2 grams per kg. of dry pulp. The adduct mixture was applied in such a manner that the aqueous solution was evenly distributed over the pulp. After the treatment the pulp was air-dried at 40° C. In a reference test the pulp was treated with an equivalent volume of distilled water without any additive. The dried pulp was thoroughly defibrated in a hammer mill. After conditioning at 20° C. and 65% relative humidity the pulp was acetylated according to a standard method as follows: 5 grams of the conditioned pulp were weighed off and put into a test tube (having a diameter of 38 mm. and a height of 200 mm.) provided with a rubber stopper protected by means of cellophane. The pulp was pretreated with 150 ml. of 99% acetic acid for one hour at room temperature. Then 100 ml. of the acetic acid was withdrawn and 60 ml. of acetic acid plus 0.27 ml. of sulfuric acid (10% based on the weighed pulp) were added, whereupon the test tube with its content was warmed to 40° C. in a water bath. When the pulp and the acetic-sulphuric acid solution had acquired the same temperature as the bath, 40 ml. of acetic acid anhydride were added and agitation was effected by means of a stainless steel bar until a homogeneous reaction mixture was obtained. The clearness (turbidity) of the initial acetate solution obtained after an acetylation of two and three hours was measured. The clearnesses were measured in a Lumetron with filter M465 and aperture 68. A high clearness value indicates properties that are more suitable for acetate production. Since the test is the same in both cases and the results are relative, no further details of the test are thought necessary. The results appear in Table III.

TABLE III

| Adduct mixture No. | Amount, g./kg. | Clearness percent 2h. | 3h. |
|---|---|---|---|
| 1 | 2 | 8.0 | 46.0 |
| Reference test (no additives) | | 0.5 | 22.0 |

From the test it appears that the suitability of the pulp for acetylation purposes is markedly improved in accordance with the invention by means of which increased clearness of the acetate is obtained.

EXAMPLES 8, 9 AND 10

To a viscose solution containing 6.9% of cellulose and 5.8% of sodium hydroxide prepared from a pre-hydrolyzed sulphate pulp were added 0.3% (based on the cellulose) of adduct mixture No. 1 (Example 8). To the same viscose was added the same amount of Adduct A of Example I (Example 9), and to the same amount of viscose was added the same amount of polyethylene glycol mol. weight 1500 (Example 10). Each viscose was spun at a gamma-value of 46 through a spinneret having 250 apertures each having a diameter of 50 microns and a take up rate of 25 meters upon the first reel. The coagulation and regeneration bath was kept at 45° C. and contained 65 grams of sulphuric acid, 59 grams of zinc sulphate and 120 grams of sodium sulphate per liter of bath liquid having a temperature of 95° C., the stretching amounting to 90%. Over the second reel a secondary bath was sprinkled at 80° C. containing 30 grams of sulphuric acid per liter of bath liquid. The yarn was washed on the third reel with water of 75° C. The coagulation and regeneration bath, the secondary bath and the washing liquid were recirculated and after spinning was completed they were analyzed for content of ethylene oxide adduct. The results are shown in Table IV.

TABLE IV

| Example No. | Additive | Total amount[1] |
|---|---|---|
| 8 | Adduct mixture No. 1 | 43 |
| 9 | Adduct A of Example 1 | 35 |
| 10 | Polyethyleneglycol, mol. weight 1500. | 10 |

[1] Total amount found in the four baths, in percent based upon additive to the viscose.

From a comparison of Examples 8 and 9 it appears that the dissolution of the added nonionic substances decreases if no solubilizing agent is present. Example 10 shows that the use of a polyethyleneglycol, which is a common additive, leaves a large amount of nonionic substance in the fibers with the drawbacks already mentioned, for instance, lower fatigue.

EXAMPLES 11(a) TO 11(i)

The solubility at room temperature in a spinning bath solution containing 5% of sulphuric acid, 5% of zinc sulphate and 14% of sodium sulphate was determined for a number of mixtures of phenol with 15 moles of ethylene oxide per mole of ethanol by measuring the turbidity at different doses of said mixtures. The turbidity was determined as adsorption by means of a Beckman DB spectrophotometer having a 1 cm. cuvette at a wave length of 450 nm. immediately and after 24 hours. The results appear in Table V.

TABLE V

| Example No. | Additive mixture | Dose g./l. | Adsorption (turbidity) Immediately | After 24 hours |
|---|---|---|---|---|
| 11(a) | 1 mole of phenol plus 15 moles of ethylene oxide. | 2.0 | 0.60 | 0.20 |
| 11(b) | 1 mole of phenol plus 15 moles of ethylene oxide. | 3.0 | 1.10 | 0.55 |
| 11(c) | 1 mole of phenol plus 15 moles of ethylene oxide. | 5.0 | 1.50 | 1.05 |
| 11(d) | 90% of 1 mole of phenol plus 15 moles of ethylene oxide in combination with 10% of 1 mole of ethanol plus 14 moles of ethylene oxide. | 2.0 | 0.06 | 0.06 |
| 11(e) | 90% of 1 mole of phenol plus 15 moles of ethylene oxide in combination with 10% of 1 mole of ethanol plus 14 moles of ethylene oxide. | 3.0 | 0.72 | 0.18 |
| 11(f) | 90% of 1 mole of phenol plus 15 moles of ethylene oxide in combination with 10% of 1 mole of ethanol plus 14 moles of ethylene oxide. | 5.0 | 1.35 | 0.56 |
| 11(g) | 70% of 1 mole of phenol plus 15 moles of ethylene oxide in combination with 30% of 1 mole of ethanol plus 14 moles of ethylene oxide. | 2.0 | 0.07 | 0.01 |
| 11(h) | 70% of 1 mole of phenol plus 15 moles of ethylene oxide in combination with 30% of 1 mole of ethanol plus 14 moles of ethylene oxide. | 3.0 | 0.19 | 0.28 |
| 11(i) | 70% of 1 mole of phenol plus 15 moles of ethylene oxide in combination with 30% of 1 mole of ethanol plus 14 moles of ethylene oxide. | 5.0 | 1.04 | 0.75 |

From the results obtained it appears that the mixture according to the invention gives a much better solubility in water immediately, as well as after storage during some time.

The resin content of the pulp is important in some ways to the properties of the cellulose product, as is known. The influence of resin is specified by Rydholm, page 1176 et seq. Pulps with the usual resin contents, below about 0.4% can be employed, but the invention makes it possible to employ pulps with less than the usual 0.15% lower limit of resin content, as described in the above examples, and pulps containing less than 0.11% resin can also be improved by the invention.

Having regard to the foregoing disclosure, the following is claimed as the inventive and patentable embodiments thereof:

1. A process for improving the processability of cellulose pulp, which comprises adding thereto an ethylene oxide adduct (A) having no or only slight surface-activity in combination with an alkylpolyglycolether (B) having no or only processing slight surface activity, the ethylene oxide adduct (A) having the general formula $$RO(C_2H_4O)_nH$$

in which R is a phenyl tolyl or xylyl radical, and $n$ is a number from 5 to 30, and represents the average number of such units in the molecule, and the alkylpolyglycolether (B) having the general formula $R_1O(C_2H_4O)_mH$ in which $R_1$ is a methyl, ethyl or propyl radical, $m$ is a number from 5 to 25, and represents the average number of such units in the molecule, the weight ratio of A:B is from 50:50 to 95:5, and the amount of A and B added to the cellulose is from 0.2 to 4.0 grams per kg. of dry cellulose, and processing the pulp in the presence of said additives.

2. The process of claim 1 in which the ratio of A:B is from 80:20 to 90:10 and in which the amount of A and B added to the cellulose is from 0.5 to 2.0 grams per kg. of dry cellulose.

3. A process as claimed in claim 1, in which the surface tension of an aqueous solution containing 0.2 gram per liter of A and B is not lower than 55 dynes/cm.

4. A process as claimed in claim 1, in which the addition of A and B is made to cellulose pulp before, during or after the drying thereof.

5. The process of claim 2 in which the cellulose is converted to viscose.

6. The process of claim 2 in which the cellulose is acetylated to form cellulose acetate.

References Cited

UNITED STATES PATENTS

| | | | |
|---|---|---|---|
| 2,623,875 | 12/1952 | Schlosser et al. | 260—212 |
| 2,692,877 | 10/1954 | Gray et al. | 260—229 |
| 2,716,058 | 8/1955 | Rapson et al. | 260—212 |
| 2,767,169 | 10/1956 | Gray et al. | 260—212 |
| 2,792,313 | 5/1957 | Charles et al. | 260—217 |

DONALD E. CZAJA, Primary Examiner

R. W. GRIFFIN, Assistant Examiner

U.S. Cl. X.R.

162—72; 260—212, 222, 229

L 16-122

PO-1050
(5/63)

UNITED STATES PATENT OFFICE
CERTIFICATE OF CORRECTION

Patent No. 3,536,697      Dated Oct. 27, 1970

Inventor(s)  Frans A. Kolosh and Fred E. Gartner

It is certified that error appears in the above-identified patent and that said Letters Patent are hereby corrected as shown below:

Col. 4, line 43,   the formula should read:

$$RO(C_2H_4O)_nH$$

Col. 6, lines 65-66,   "acetic-sulphuric acid" should be -- acetic acid-sulphuric acid --

Col. 8, line 62,   "processing" should be -- possessing --.

Signed and sealed this 29th day of June 1971.

(SEAL)
Attest:

EDWARD M. FLETCHER, JR.
Attesting Officer

WILLIAM E. SCHUYLER, JR.
Commissioner of Patents